United States Patent
Vembu et al.

(10) Patent No.: US 9,304,813 B2
(45) Date of Patent: Apr. 5, 2016

(54) CPU INDEPENDENT GRAPHICS SCHEDULER FOR PERFORMING SCHEDULING OPERATIONS FOR GRAPHICS HARDWARE

(75) Inventors: Balaji Vembu, Folsom, CA (US);
Aditya Navale, Folsom, CA (US);
Murali Ramadoss, Folsom, CA (US);
David I. Standring, Mather, CA (US);
Kritika Bala, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 594 days.

(21) Appl. No.: 13/552,122

(22) Filed: Jul. 18, 2012

(65) Prior Publication Data
US 2014/0026137 A1    Jan. 23, 2014

(51) Int. Cl.
*G06F 9/46* (2006.01)
*G06F 15/16* (2006.01)
*G06F 7/38* (2006.01)
*G06F 9/48* (2006.01)

(52) U.S. Cl.
CPC .............. *G06F 9/4881* (2013.01); *Y02B 60/144* (2013.01)

(58) Field of Classification Search
None
See application file for complete search history.

(56) References Cited

U.S. PATENT DOCUMENTS

| | | |
|---|---|---|
| 2009/0160867 A1 | 6/2009 | Grossman |
| 2011/0050713 A1 | 3/2011 | McCrary et al. |
| 2011/0210976 A1 | 9/2011 | Diard |

FOREIGN PATENT DOCUMENTS

| | | |
|---|---|---|
| WO | 2011-134942 A1 | 11/2011 |
| WO | 2014/014628 A1 | 1/2014 |

OTHER PUBLICATIONS

International Search Report and Written Opinion received for PCT Application No. PCT/US2013/047638, mailed on Aug. 30, 2013, 11 pages.

*Primary Examiner* — Meng An
*Assistant Examiner* — Bing Zhao
(74) *Attorney, Agent, or Firm* — International IP Law Group, P.L.L.C.

(57) ABSTRACT

A computing device for performing scheduling operations for graphics hardware is described herein. The computing device includes a central processing unit (CPU) that is configured to execute an application. The computing device also includes a graphics scheduler configured to operate independently of the CPU. The graphics scheduler is configured to receive work queues relating to workloads from the application that are to execute on the CPU and perform scheduling operations for any of a number of graphics engines based on the work queues.

15 Claims, 10 Drawing Sheets

400

700

US 9,304,813 B2

CPU INDEPENDENT GRAPHICS SCHEDULER FOR PERFORMING SCHEDULING OPERATIONS FOR GRAPHICS HARDWARE

TECHNICAL FIELD

The present invention relates generally to performing scheduling operations for graphics engines. More specifically, the present invention relates to performing scheduling operations for graphics engines of a computing device independently of the central processing unit (CPU) via a graphics scheduler.

BACKGROUND ART

The graphics subsystem hardware in a computing device typically includes several independent graphics engines. Software known as a graphics scheduler may be used to schedule the graphics engines to execute the graphics workloads that execute on the hardware. However, according to current techniques, the graphics scheduler is executed by the central processing unit (CPU) of the computing device. Executing the graphics scheduler on the CPU may impose significant latency overheads due to communication delays between the graphics engines and the CPU, which communicate via interrupts and memory-mapped input/output (MMIO) based programming. In addition, such communications between the CPU and the graphics engines may result in a large amount of power consumption, since the CPU may be forced to intermittently switch from a low power state to a high power state in order to perform scheduling operations.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
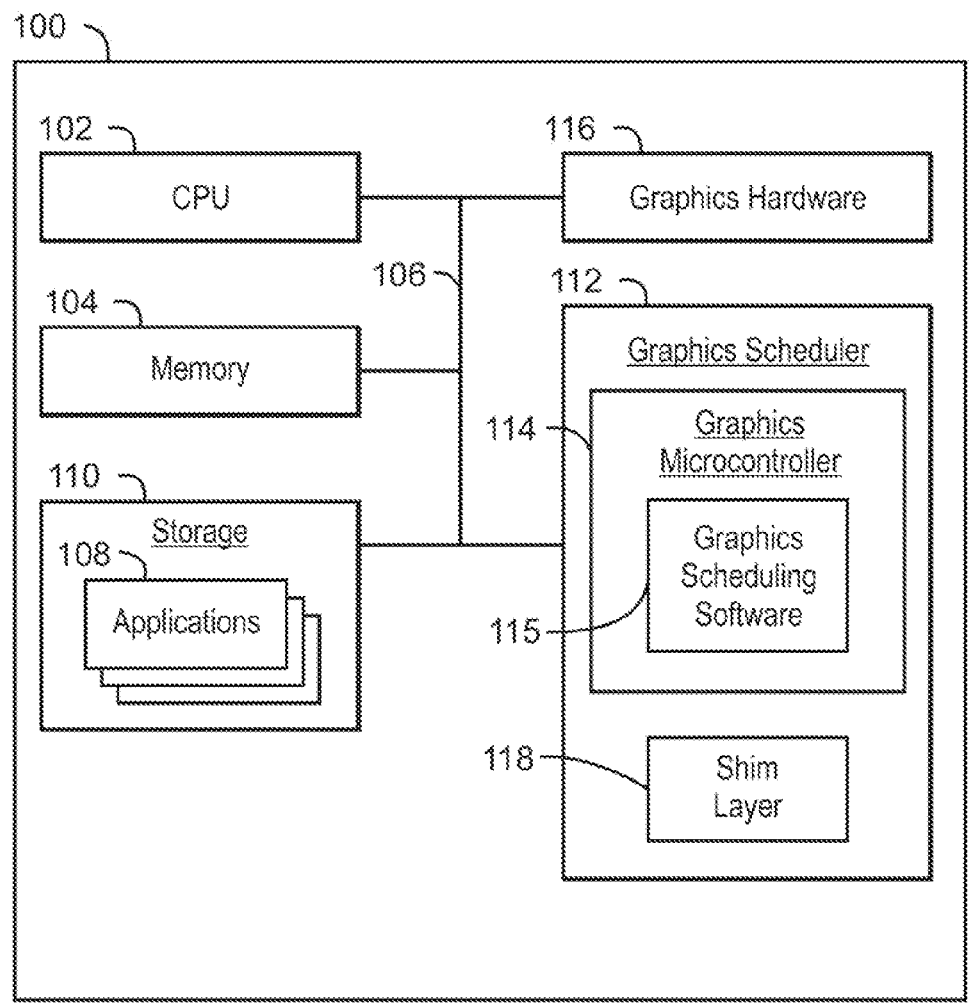
FIG. 1 is a block diagram of a computing device that may be used in accordance with embodiments.

As discussed above, embodiments described herein relate to performing scheduling operations for graphics engines of a computing device independently of the central processing unit (CPU) via a graphics scheduler. The graphics scheduler may include a graphics microcontroller that is capable of performing scheduling operations based on workloads received from one or more applications executing on the CPU of the computing device. For example, the graphics scheduler may dynamically determine an appropriate graphics engine for executing each particular workload. In addition, the graphics scheduler may determine an order in which to execute the workloads for each graphics engine. Then, the graphics scheduler may forward the workloads, as well as the order of execution for the workloads, to the appropriate graphics engines for execution. In various embodiments, the graphics scheduler performs such scheduling operations with little input from the CPU of the computing device.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a computing device 100 that may be used in accordance with embodiments. The computing device 100 may be, for example, a laptop computer, desktop computer, tablet computer, mobile device, or server, among others. The computing device 100 may include a CPU 102 that is adapted to execute stored instructions, as well as a memory device 104 that stores instructions that are executable by the CPU 102. The CPU 102 may control and coordinate the overall operation of the computing device 100. The CPU 102 can be a single core processor, a multi-core processor, a computing cluster, or any number of other configurations.

The memory device 104 may include a main memory of the computing device 100. In addition, the memory device 104 can include any form of random access memory (RAM), read-only memory (ROM), flash memory, or the like. For example, the memory device 104 may be one or more banks of memory chips or integrated circuits. The CPU 102 may have direct access to the memory device 104 through a bus 106.

The instructions that are executed by the CPU 102 may be used to execute any of a number of applications 108 residing within a storage device 110 of the computing device 100. The applications 108 may be any types of applications or programs having graphics, graphics objects, graphics images, graphics frames, video, or the like, to be displayed to a user of the computing device 100. The CPU 102 may be connected to the storage device 110 through the bus 106. The storage device 110 can include a hard drive, an optical drive, a thumb-drive, an array of drives, or any combinations thereof.

The CPU 102 may also be linked through the bus 106 to a graphics scheduler 112. The graphics scheduler 112 may be configured to perform scheduling operations for the applications 108 executing on the CPU 102. The graphics scheduler 112 may include a graphics microcontroller 114. The graphics microcontroller 114 may be configured to perform scheduling operations for graphics hardware 116.

In various embodiments, the graphics microcontroller 114 interfaces with the graphics hardware 116 via a shim layer 118. The shim layer 118 may be configured to intercept interrupts and other messages from the graphics hardware 116 and forward such interrupts and other messages to the graphics microcontroller 114. This may allow for direct scheduling of the tasks, or work queues, requested by the applications 108 with little input from the CPU 102. Thus, the delay and the power consumption for scheduling the graphics tasks may be lower than the delay and the power consumption associated with previous techniques, which relied on scheduling algorithms and decisions being executed on the CPU 102 for scheduling graphics tasks.

In various embodiments, the graphics microcontroller 114 includes graphics scheduling software 115. The graphics scheduling software 115 may be loaded into hardware of the computing device 100 via a graphics driver (not shown) shortly after the boot-up phase of the computing device 100. The graphics driver may be included within a graphics subsystem of the computing device 100, and may include system software.

It is to be understood that the block diagram of FIG. 1 is not intended to indicate that the computing device 100 is to include all of the components shown in FIG. 1. Further, the computing device 100 may include any number of additional components not shown in FIG. 1, depending on the specific implementation.

Figure 2:
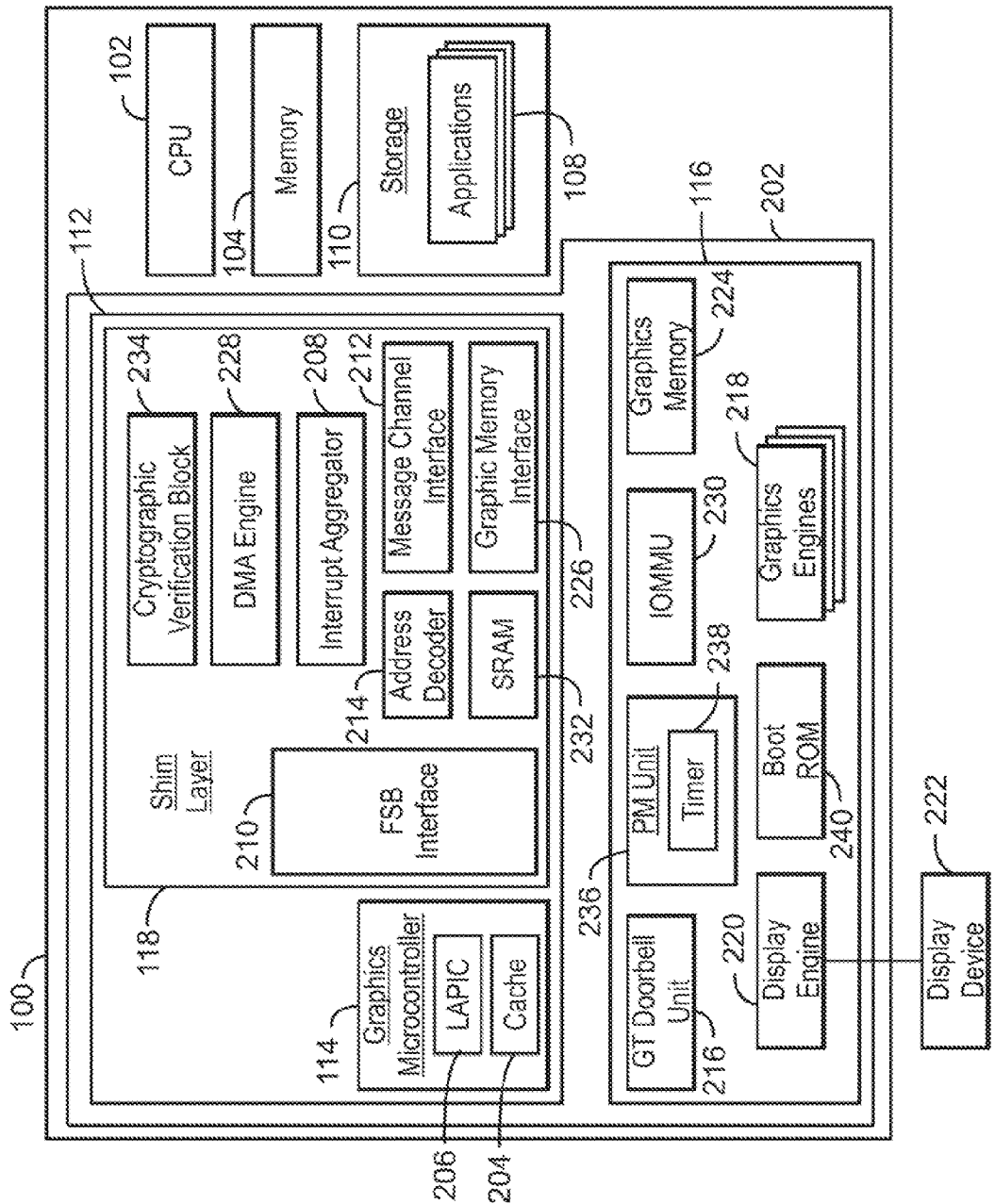
FIG. 2 is a block diagram of the computing device including internal components of a graphics subsystem of the computing device.

FIG. 2 is a block diagram of the computing device 100 including internal components of a graphics subsystem 202 of the computing device 100. Like numbered items are as described with respect to FIG. 1. In various embodiments, the graphics subsystem 202 includes both the graphics scheduler 112 and the graphics hardware 116. As discussed above, the graphics scheduler 112 may include the graphics microcontroller 114 for performing scheduling operations for the graphics hardware 116, as well as the shim layer 118 that serves as the interface between the graphics microcontroller 114 and the graphics hardware 116.

The graphics microcontroller 114 may be a general purpose core residing within the graphics subsystem 202 of the computing device 100, and may operate at frequencies that are similar to the typical frequencies of the graphics subsystem 202, e.g., up to around 1.4 gigahertz. In addition, the graphics microcontroller 114 may include a cache 204. The cache may be small, e.g., around 8 kilobytes, and may be used to store data relating to work queues received from any of the applications 108, as well as information relating to the scheduling operations for the graphics hardware 116.

The graphics microcontroller 114 may also include a local advanced programmable interrupt controller (LAPIC) 206. The LAPIC 206 may be used to handle interrupts from various sources, such as the applications 108, the CPU 102, and the graphics hardware 116. In various embodiments, the interrupts are collected from the various sources and sent to the LAPIC 206 via an interrupt aggregator 208 residing within the shim layer 118.

The graphics microcontroller 114 may interface with the shim layer 118 via a front side bus (FSB) interface 210. The shim layer 118 may communicate with the rest of the graphics subsystem 202 via a message channel interface 212. Data may be transferred between the graphics microcontroller 114 and the applications 108 executing on the CPU 102 through memory. In some embodiments, an address decoder 214 may serve as a traffic router for the transfer of the data. Further, the message channel interface 212 may be configured to handle the transfer of messages, or notifications, between the graphics microcontroller 114 and the rest of the graphics subsystem 202. For example, one of the applications 108 may write commands and data to one or more memory locations within the graphics subsystem 202 to request submission of work queues to the graphics hardware. In response, a graphics translation (GT) doorbell unit 216 included within the graphics hardware 116 may monitor the altered memory locations to detect arrival of new work queues, and send a message to the graphics microcontroller 114 via the message channel interface 212. The message may include information regarding the cause of an interrupt. The graphics microcontroller may then read the message queue to determine the details of the graphics workload to be executed.

As shown in FIG. 2, the graphics hardware 116 includes a number of graphics engines 218. Each of the graphics engines 218 may be configured to perform specific graphics tasks, or to execute specific types of workloads. In addition, the graphics hardware 116 may include a display engine 220 that is configured to display data to a user of the computing device 100 via a display device 222. The data that is displayed may include, for example, data that is rendered by one or more of the graphics engines 218. Further, the graphics engines 218 and the display engine 220 may be configured to send event notifications about executing workloads to the graphics microcontroller 114. For example, the display engine 220 may send notifications about typical synchronizing events, e.g., flips or Vsyncs, to the graphics microcontroller 114. In some embodiments, such event notifications are sent in the form of interrupts, which indicate that a particular workload or a particular hardware device is requesting attention.

The graphics hardware 116 may also include graphics memory 224. In some embodiments, the graphics memory 224 is a portion of the main memory, e.g., the memory device 104, of the computing device 100 that is devoted to storing graphics data. For example, the graphics memory 224 may include data structures that are used for the scheduling procedure. The graphics scheduler 112 may access the graphics memory 224 via a graphics memory interface 226 that resides within the shim layer 118. The shim layer 118 may also include a direct memory access (DMA) engine 228 that is configured to allow certain components of the graphics subsystem 202, such as the graphics microcontroller 114, to efficiently access specific memory regions, such as the memory device 104 or the graphics memory 224, independently of the CPU 102.

The graphics hardware 116 may also include an input/output memory management unit (IOMMU) 230. The IOMMU 230 may be configured to translate a graphics virtual memory address, e.g., a graphics virtual address (GVA) included in an instruction or work queue from one of the applications 108, to a physical memory address, e.g., a host physical address (HPA). This may be accomplished, for example, via a multi-level page table walk, wherein the number of levels included in the page table walk depends on the size of the address space to be supported.

The code that is used to implement the scheduling procedure described herein may be stored within static random access memory (SRAM) 232 within the shim layer 118. The code within the SRAM 232 may be used to direct the functioning of the graphics microcontroller 114. In some embodiments, the code is loaded into the SRAM 232 via the DMA engine 228. In addition, the shim layer 118 may include a standard cryptographic verification block 234 that is configured to authenticate the code within the SRAM 232 before execution to ensure that the code has not been modified.

In some embodiments, the graphics hardware 116 includes a power management (PM) unit 236. The PM unit 236 may be configured to monitor the activity of the graphics microcontroller 114. In some embodiments, the PM unit 236 may power down the graphics device when all the graphics engines 218 are idle. In addition, a timer 238 may be used to keep track of scheduling timelines.

As discussed above, in some embodiments, the graphics scheduler 112 is loaded into hardware of the computing device 100 via a graphics driver (not shown) shortly after the boot-up phase of the computing device 100. In such embodiments, initialization code for the graphics scheduler 112 is included within boot read-only memory (bootROM) 240. Such initialization code may be used to verify the scheduling code contained in the SRAM 232. For example, the scheduling code may be copied into an isolated memory region and verified using the initialization code before execution of the scheduling procedure.

It is to be understood that the block diagram of FIG. 2 is not intended to indicate that the computing device 100 is to include all of the components shown in FIG. 2. Further, the computing device 100 may include any number of additional components not shown in FIG. 2, depending on the specific implementation.

Figure 3:
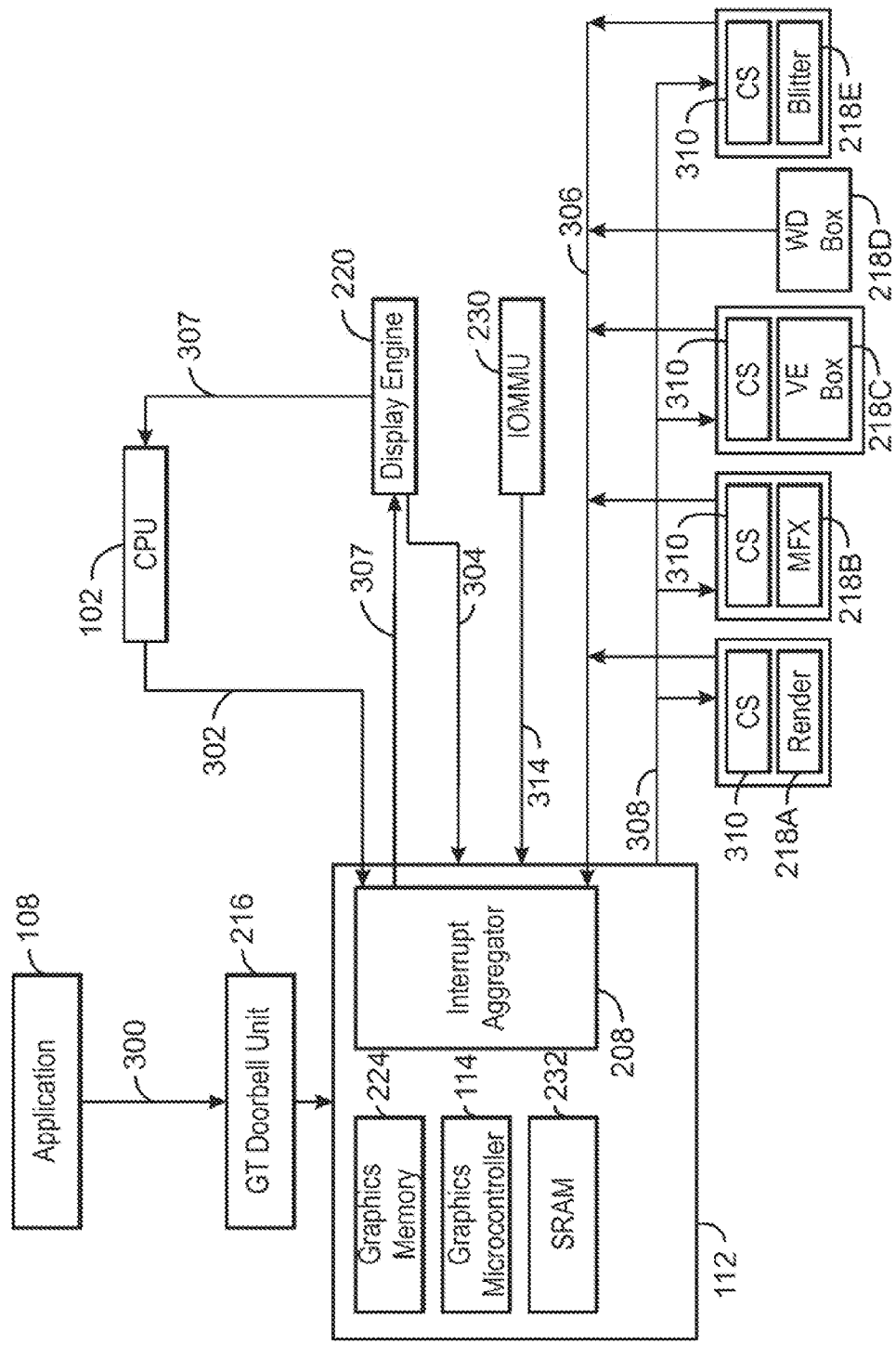
FIG. 3 is a block diagram showing the functioning of the graphics scheduler of the computing device.

FIG. 3 is a block diagram showing the functioning of the graphics scheduler 112 of the computing device 100. Like numbered items are as described with respect to FIGS. 1 and 2. In various embodiments, an application 108 sends work queues including a number of graphics workloads to the GT doorbell unit 216, as indicated by arrow 300. The GT doorbell unit 216 may then send information relating to the work queues to the graphics scheduler 112. The information relating to the work queues may be utilized by the graphics scheduler 112 for the scheduling procedure. In addition, any of the information relating to the work queues may be stored within the SRAM 232 for future usage.

In various embodiments, the graphics scheduler 112 also uses interrupts received from any of a number of sources to perform the scheduling procedure. For example, interrupts may be received from the CPU 102, as indicated by arrow 302, the display engine 220, as indicated by arrow 304, or any of the graphics engines 218, as indicated by arrow 306. The interrupts may include information relating to events that are requesting attention. Such interrupts may be collected within the interrupt aggregator 208. In some embodiments, the interrupt aggregator 208 prioritizes the interrupts based on any number of factors. This prioritization allows the graphics scheduler 112 to assign higher priority to an interrupt received from one of the graphics engines 218, which may have completed a previous task and be ready to accept a next task, than an interrupt received from the application 108. For example, if the graphics scheduler 112 is reading the application workload in memory, the graphics scheduler 112 may be interrupted by a high priority interrupt indicating that a graphics engine 218 is idle. This allows the graphics scheduler 112 to suspend the application workload processing, submit a waiting workload to the graphics engine 218, and then return to the application workload processing.

Further, interrupts may be sent to the CPU 102, e.g., the host. In some embodiments, such interrupts are sent via the display engine 220, as indicated by arrow 307. However, the interrupts may also be sent to the CPU 102 independently of the display engine 220. The interrupts may be sent to the CPU 102 in order to inform the graphics driver running on the CPU 102 about the state of the scheduling procedure, e.g., whether the scheduling procedure has been successfully completed, is pending, or has failed. The interrupts may also inform the CPU 102 about the state of the each of the workloads within the work queues, e.g., whether execution of the workload has been successfully completed, is pending, or has failed.

According to embodiments disclosed herein, the graphics scheduler 112 is used to schedule workloads for any of the graphics engines 218 or the display engine 220, or any combinations thereof. For example, in response to input from the graphics microcontroller 114, the graphics scheduler 112 may submit a runlist 308 to any of the graphics engines 218. The runlist 308 may include specific workloads to be performed by each of the graphics engines 218.

In some embodiments, each of the graphics engines 218 includes a command streamer 310 that is configured to point to specific memory locations that include instructions/commands relating to the workloads to be completed, and to fetch the instructions/commands from the memory locations. For example, the runlist 308 may include a number of workloads that relate to specific memory locations, and the command streamer 310 may include a runlist port register (not shown) that includes the specific memory locations from which to fetch commands based on the runlist 308. The graphics scheduler 112 may submit the runlist 308 by writing the runlist 308 to the runlist port register of the corresponding graphics engine.

Further, in various embodiments, each of the graphics engines 218 is configured to perform specific workloads relating to graphics tasks. For example, the render graphics engine 218A may be configured to access graphics data stored in the graphics memory 224, and render such graphics data. In some embodiments, the render graphics engine 218A includes a render data path that includes translation tables for converting GVAs to HPAs. The MFX graphics engine 218B may be configured to perform video decoding graphics tasks, and the VE box graphics engine 218C may be configured to perform video encoding graphics tasks. In addition, the WD box graphics engine 218D may be configured to provide wireless display functionalities, and the blitter graphics engine 218E may be configured to provide block image transfer functionalities.

According to embodiments described herein, once the runlist 308 has been submitted to the graphics engines 218 and processed by the corresponding command streamers 310, the graphics engines 218 may execute their respective workloads. In addition, interrupts may be generated to indicate that particular workloads have been successfully completed, or that problems occurred during execution of particular workloads, for example.

The display engine 220 may also communicate events to the graphics scheduler 112 to enable scheduling new tasks on the graphics engines 218. For example, the display engine 220 may perform a page flip for switching a page being displayed by a display screen. The display engine 220 may be configured to send a completion message, e.g., a "Flip Done" message, to the graphics scheduler 112 upon completion of the workload, as indicated by the arrow 304.

In various embodiments, the IOMMU 230 is configured to translate a GVA to a HPA, as discussed above. In addition, the IOMMU 230 may be used to access particular memory locations, or pages, requested by a workload. However, in some embodiments, such an access to memory may fail because the page table walker may find that the GVA does not have a valid translation to HPA, or that the type of access attempted is not allowed by the page table attributes, such as, for example, a write access to a page that is marked read-only. This may cause the IOMMU 230 to generate a page-fault event to notify an IOMMU driver (not shown) within the system software. The IOMMU driver may then either fix the page table to allow the access to proceed, e.g., page fault fulfilled, or indicate to the IOMMU 230 that the page fault cannot be serviced. The IOMMU may communicate the page fault fulfilled or not fulfilled message to the graphics scheduler 112. The graphics scheduler 112 may use such messages to determine possible changes to the schedules for the graphics engines 218. For example, the graphics scheduler may decide to pre-empt a running task whose progress may be hindered by the page fault and schedule a different task that can make better progress on the graphics engine 218.

Figure 4:
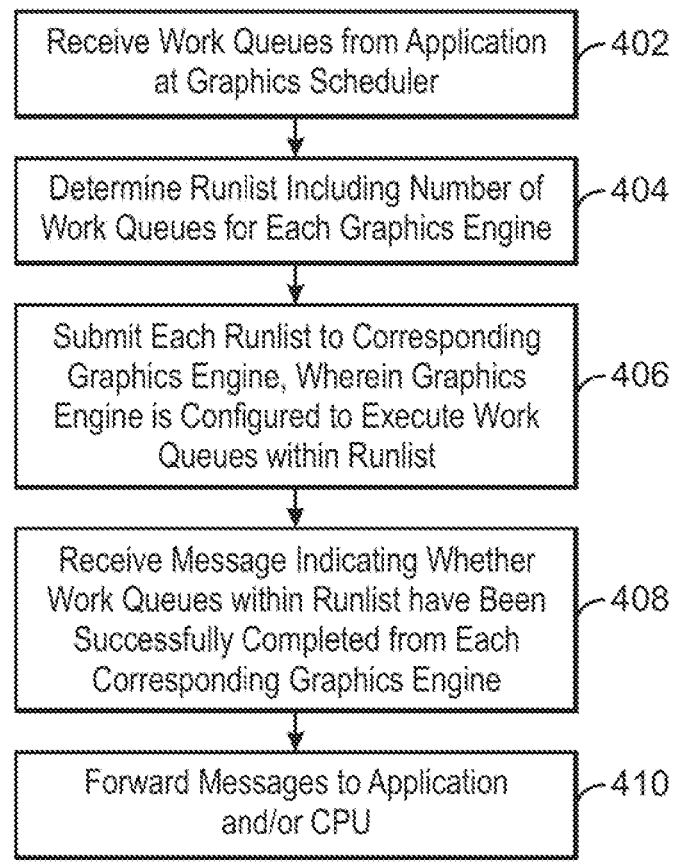
FIG. 4 is a process flow diagram showing a method for scheduling and executing work queues.

FIG. 4 is a process flow diagram showing a method for scheduling and executing work queues. The graphics scheduler 112 discussed above with respect to FIGS. 1, 2, and 3 may be used to schedule the work queues, and the graphics engines 218 may be used to execute the work queues.

The method begins at block 402, at which work queues are received from an application at a graphics scheduler. The application may be executing on the computing device in which the graphics scheduler resides. The work queues may include a number of workloads that are to be executed by graphics engines that also reside within the computing device.

At block 404, a runlist including a number of work queues is determined for each graphics engine via the graphics scheduler. The runlists may be determined according to the types of work queues that can be executed by each graphics engine. The runlists may specify the specific work queues that are to be executed by each graphics engine, as well as the proper order of execution for the work queues.

At block 406, the graphics scheduler submits each runlist to the corresponding graphics engine, wherein the graphics engine is configured to execute the work queues within the runlist. In some embodiments, a graphics engine executes the work queues immediately. In other embodiments, the graphics engine waits until a specified time, or until execution of a previous runlist is complete, to execute the work queues.

At block 408, a message indicating whether work queues within the runlist have been successfully completed is received from each corresponding graphics engine. The graphics scheduler may use the messages to determine whether the scheduling procedure has been successfully completed. For example, if work queues within any of the runlists failed to execute, the graphics scheduler may reschedule the work queues.

At block 410, the messages are forwarded to the application that initiated the work queues and/or the CPU of the computing device. In some embodiments, if a message indicates that a work queue has been successfully completed, the application and/or the CPU may access the result, or output, of the work queue generated by the corresponding graphics engine.

It is to be understood that the process flow diagram of FIG. 4 is not intended to indicate that the blocks of the method 400 are to be executed in any particular order, or that all of the blocks are to be included in every case. Further, any number of additional blocks not shown in FIG. 4 may be included within the method 400, depending on the specific implementation.

Figure 5:
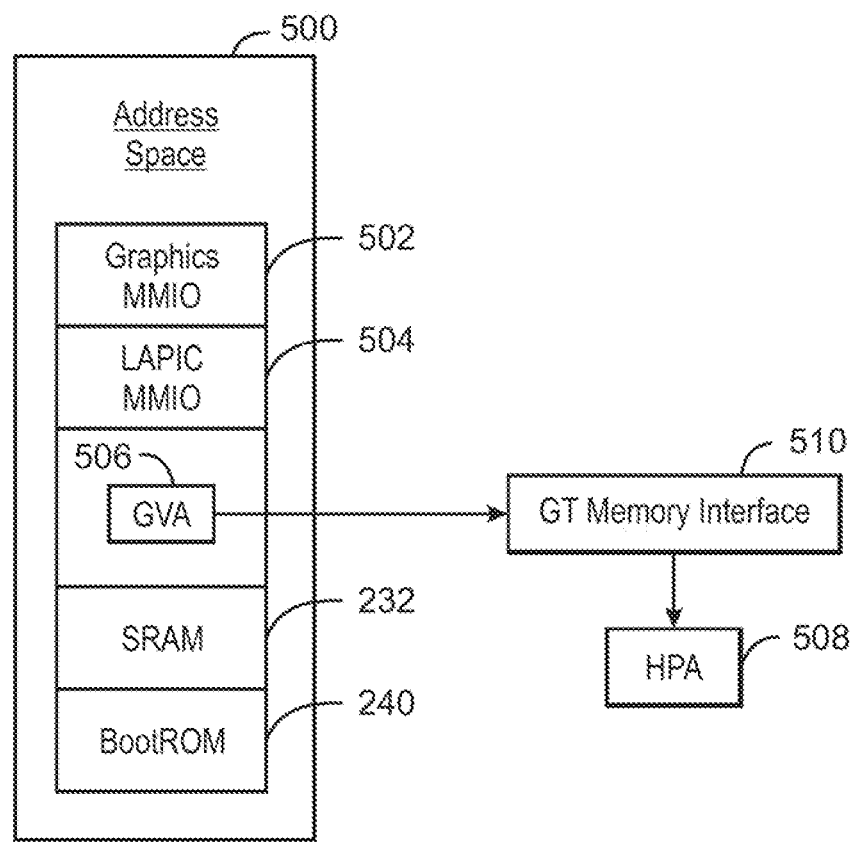
FIG. 5 is a block diagram of an exemplary address space that may be used in accordance with embodiments.

FIG. 5 is a block diagram of an exemplary address space 500 that may be used in accordance with embodiments. Like numbered items are as described with respect to FIGS. 1 and 2. The address space may include graphics memory-mapped input/output (MMIO) 502 and LAPIC MMIO 504 that provide for input and output between various devices within the graphics subsystem 202 and the CPU 102. The address space 500 also includes portions of the SRAM 232 and the bootROM 240, such as, for example, the portions of the SRAM 232 and the bootROM 240 that are referenced by the particular workload to which the address space 400 relates.

The address space 500 may also include a graphics virtual memory address, e.g., GVA 506, that relates to a particular physical memory address, e.g., HPA 508, within physical memory of the computing device 100, e.g., the memory device 104 or the graphics memory 224.

In various embodiments, a graphics translation (GT) memory interface 510 residing, for example, within the IOMMU 230 may be used to convert the GVA 506 to the HPA 508. This may be performed in response to input from the graphics microcontroller 114 regarding some action that is to be performed. Once the HPA 508 has been obtained, the specific data structures residing at the corresponding physical memory address may be accessed.

The translation procedure may be performed via a multi-level page table walk, wherein the number of levels included in the page table walk depends on the size of the address space to be supported. The page table walk may be based on, for example, a graphics translation table (GTT) or virtualization technology for DMA devices (VtD), among others. The GTT may be used to translate the GVA 506 to the HPA 508. In addition, the GTT may be created by the graphics driver during loading or execution of an application 108 within the computing device 100.

Figure 6:
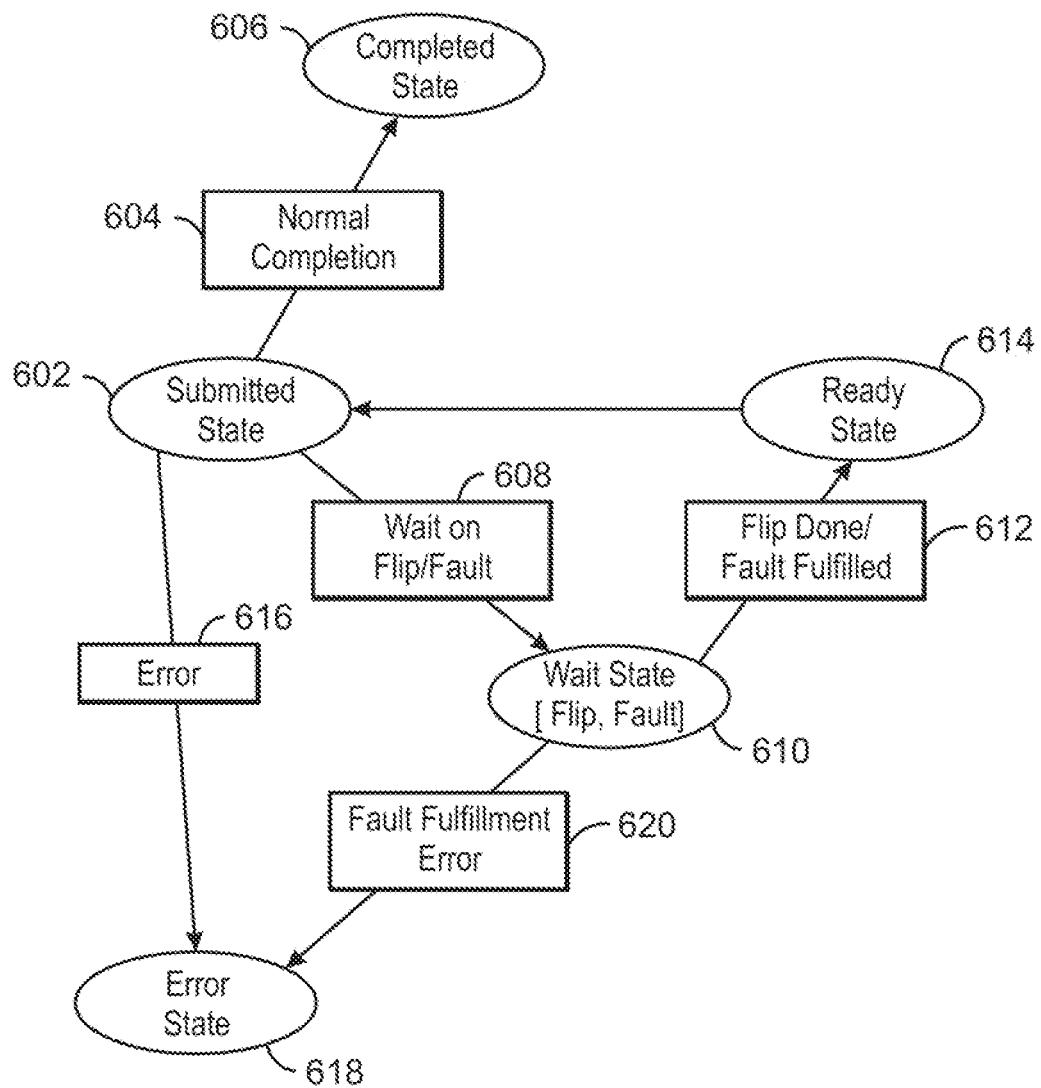
FIG. 6 is a flow diagram showing a number of possible states for a workload.

FIG. 6 is a flow diagram 600 showing a number of possible states for a workload. Like numbered items are as described with respect to FIGS. 1 and 2. When the graphics scheduler 112 submits the workload to one of the graphics engines 218, the workload enters a submitted state 602. Once the workload enters the submitted state 602, normal completion of the workload may be attempted. If an indication 604 of normal completion of the workload is received, the workload enters a completed state 606. The graphics engine 218 may then send a notification to the graphics scheduler 112 or the application 108 that initiated the workload indicating that the workload has been executed.

If the workload is not successfully completed on the first attempt but, rather, encounters a notification 608 to wait for an event before proceeding, the workload enters a wait state 610. The event may be a notification that the display engine 220 has finished displaying the buffer, e.g., flip, or that a page fault has occurred, for example. The workload may remain in the wait state until an indication 612 that the flip has been completed or the fault has been fulfilled is received. Once the flip has been completed or the fault has been fulfilled, the workload enters a ready state 614. From the ready state 614, the workload may reenter the submitted state 602.

If an indication of an error 616 is received, the workload may enter an error state 618. In addition, if an indication 620 of an error, e.g., a fault fulfillment error, is received while the workload is in the wait state 610, the workload may enter the error state 618. In some embodiments, if the workload enters the error state 618, the graphics scheduler 112 is notified of the failure to execute the particular workload. The graphics scheduler may then convey this to the application 108.

Figure 7:
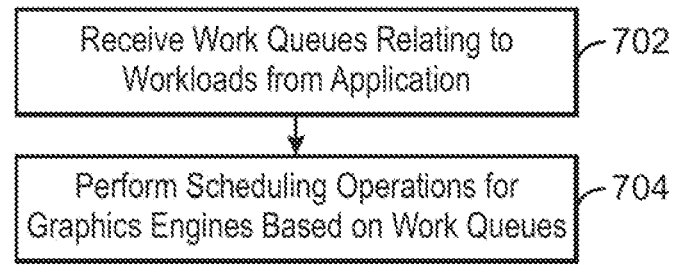
FIG. 7 is a process flow diagram showing a method for performing scheduling operations for graphics hardware.

FIG. 7 is a process flow diagram showing a method 700 for performing scheduling operations for graphics hardware. The method 700 may be performed by the computing device 100 described above with respect to FIGS. 1, 2, and 3.

The method begins at block 702, at which work queues relating to workloads from an application are received. The work queues may be received from an application executing on the CPU of the computing device. Each of the work queues may include a number of workloads, wherein the workloads relate to graphics tasks to be performed. Exemplary graphics tasks include rendering graphics data to produce graphics images or displaying graphics images to a user of the computing device. Such graphics images may include pixel images, encoded images, video images or frames, static images, photo images, or animated images, among others.

At block 704, scheduling operations for graphics engines are performed based on the work queues. In various embodiments, the scheduling operations are performed via the graphics scheduler independently of the CPU. Performing scheduling operations for the graphics engines may include determining a graphics engine to execute each of the workloads, and determining an order of executing workloads for each graphics engine. The order of executing workloads for each graphics engine may be determined according to any type of prioritization scheme. The graphics scheduler may notify the graphics engines of the determined order of executing workloads by writing to a runlist port register within a command streamer of each of the graphics engines.

In some embodiments, the graphics scheduler may access physical memory spaces relating to any of the work queues by translating graphics virtual memory addresses into corresponding physical memory addresses. Accessing such physical memory spaces may aid in the scheduling procedure by providing the graphics scheduler with more information about each of the work queues. For example, the graphics scheduler may determine the size and complexity of the workloads within a particular work queue by analyzing the content that relates to each of the workloads.

Interrupts relating to the scheduling operations may be received from the CPU, the display engine, or any of the graphics engines, or any combinations thereof. Such interrupts may be collected within an interrupt aggregator of the graphics scheduler. The interrupts may then be used by the graphics scheduler to perform the scheduling operations.

It is to be understood that the process flow diagram of FIG. 7 is not intended to indicate that the blocks of the method 700 are to be executed in any particular order, or that all of the blocks are to be included in every case. Further, any number of additional blocks may be included within the method 700, depending on the specific implementation.

In some embodiments, the method 700 also includes notifying the application upon successful completion of a workload by a corresponding graphics engine. When a graphics engine completes a particular workload, the graphics engine may notify the graphics scheduler that the workload has entered the completed state via an internal messaging system. The graphics scheduler may then notify the application or the host, e.g., the CPU itself, that the workload has been successfully completed. Further, in some embodiments, the graphics engine may notify the graphics scheduler if the workload has entered a wait state or an error state. The graphics scheduler may then notify the application or the host that the graphics engine is not done completing the workload, or has failed to complete the workload.

Figure 8:
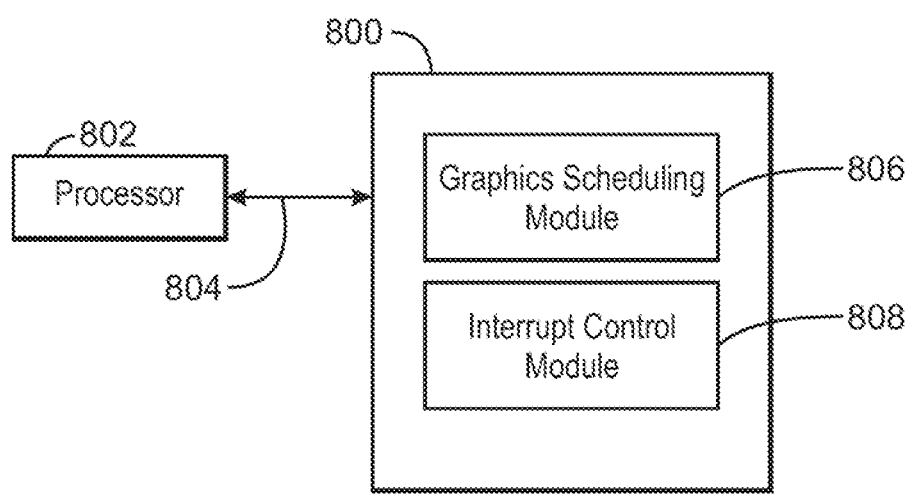
FIG. 8 is a block diagram showing a tangible, non-transitory computer-readable medium that stores code for performing scheduling operations for graphics hardware.

FIG. 8 is a block diagram showing a tangible, non-transitory computer-readable medium 800 that stores code for performing scheduling operations for graphics hardware. The tangible, non-transitory computer-readable medium 800 may be accessed by a processor 802 over a computer bus 804. Furthermore, the tangible, non-transitory, computer-readable medium 800 may include code configured to direct the processor 802 to perform the methods described herein. The various software components discussed herein may be stored on the tangible, computer-readable medium 800, as indicated in FIG. 8. For example, a graphics scheduling module 806 may be configured to perform scheduling operations for graphics hardware. In addition, an interrupt control module 808 may be configured to analyze interrupts received from the graphics hardware or the CPU, and respond to such interrupts.

Figure 9:
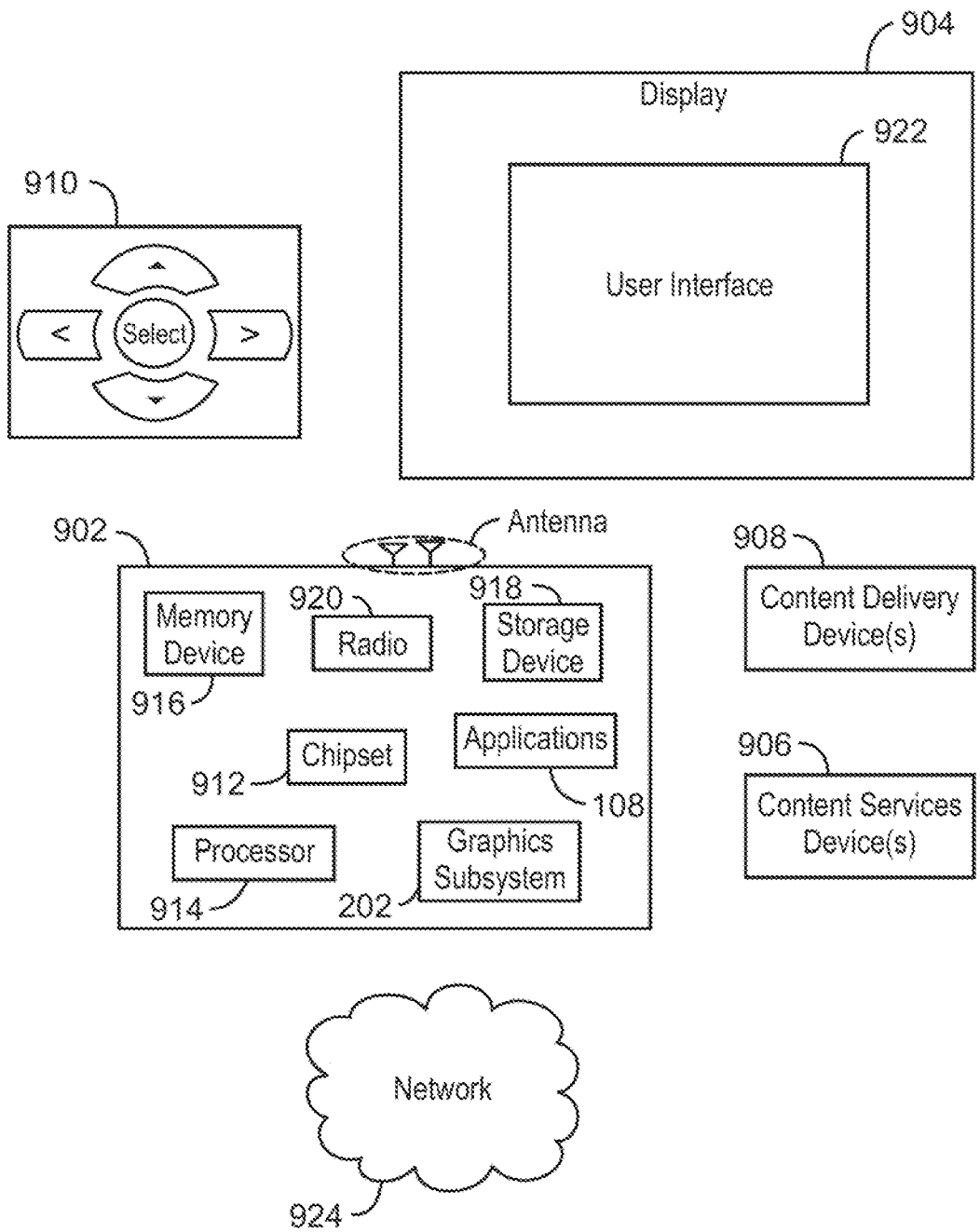
FIG. 9 is a block diagram of an exemplary system for implementing a graphics subsystem.

FIG. 9 is a block diagram of an exemplary system 900 for implementing the graphics subsystem 202. Like numbered items are as described with respect to FIGS. 1 and 2. In some embodiments, the system 900 is a media system. In addition, the system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, or the like.

In various embodiments, the system 900 comprises a platform 902 coupled to a display 904. The platform 902 may receive content from a content device, such as content services device(s) 906 or content delivery device(s) 908, or other similar content sources. A navigation controller 910 including one or more navigation features may be used to interact with, for example, the platform 902 and/or the display 904. Each of these components is described in more detail below.

The platform 902 may include any combination of a chipset 912, a processor 914, a memory device 916, a storage device 918, the graphics subsystem 202, applications 108, and a radio 920. The chipset 912 may provide intercommunication among the processor 914, the memory device 916, the storage device 918, the graphics subsystem 202, the applications 108, and the radio 920. For example, the chipset 912 may include a storage adapter (not shown) capable of providing intercommunication with the storage device 918.

The processor 914 may be implemented as Complex Instruction Set Computer (CISC) or Reduced Instruction Set Computer (RISC) processors, x86 instruction set compatible processors, multi-core, or any other microprocessor or central processing unit (CPU). In some embodiments, the processor 914 includes dual-core processor(s), dual-core mobile processor(s), or the like.

The memory device 916 may be implemented as a volatile memory device such as, but not limited to, a Random Access Memory (RAM), Dynamic Random Access Memory (DRAM), or Static RAM (SRAM). The storage device 918 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, the storage device 918 includes technology to increase the storage performance enhanced protection for valuable digital media when multiple hard drives are included, for example.

The graphics subsystem 202 may perform processing of images such as still or video for display. The graphics subsystem 202 may include a graphics processing unit (GPU) or a visual processing unit (VPU), for example. An analog or digital interface may be used to communicatively couple the graphics subsystem 202 and the display 904. For example, the interface may be any of a High-Definition Multimedia Interface, DisplayPort, wireless HDMI, and/or wireless HD compliant techniques. The graphics subsystem 202 may be integrated into the processor 914 or the chipset 912. Alternatively, the graphics subsystem 202 may be a stand-alone card communicatively coupled to the chipset 912.

The graphics and/or video processing techniques described herein may be implemented in various hardware architectures. For example, graphics and/or video functionality may be integrated within the chipset 912. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 920 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 920 may operate in accordance with one or more applicable standards in any version.

The display 904 may include any television type monitor or display. For example, the display 904 may include a computer display screen, touch screen display, video monitor, television, or the like. The display 904 may be digital and/or analog.

In some embodiments, the display 904 is a holographic display. Also, the display 904 may be a transparent surface that may receive a visual projection. Such projections may convey various forms of information, images, objects, or the like. For example, such projections may be a visual overlay for a mobile augmented reality (MAR) application. Under the control of one or more applications 108, the platform 902 may display a user interface 922 on the display 904.

The content services device(s) 906 may be hosted by any national, international, or independent service and, thus, may be accessible to the platform 902 via the Internet, for example. The content services device(s) 906 may be coupled to the platform 902 and/or to the display 904. The platform 902 and/or the content services device(s) 908 may be coupled to a network 924 to communicate (e.g., send and/or receive) media information to and from the network 924. The content delivery device(s) 908 also may be coupled to the platform 902 and/or to the display 904.

The content services device(s) 906 may include a cable television box, personal computer, network, telephone, or Internet-enabled device capable of delivering digital information. In addition, the content services device(s) 906 may include any other similar devices capable of unidirectionally or bidirectionally communicating content between content providers and the platform 902 or the display 904, via the network 924 or directly. It will be appreciated that the content may be communicated unidirectionally and/or bidirectionally to and from any one of the components in the system 900 and a content provider via the network 924. Examples of content may include any media information including, for example, video, music, medical and gaming information, and so forth.

The content services device(s) 906 may receive content such as cable television programming including media information, digital information, or other content. Examples of content providers may include any cable or satellite television or radio or Internet content providers, among others.

In some embodiments, the platform 902 receives control signals from the navigation controller 910, which includes one or more navigation features. The navigation features of the navigation controller 910 may be used to interact with the user interface 922, for example. The navigation controller 910 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of the navigation controller 910 may be echoed on the display 904 by movements of a pointer, cursor, focus ring, or other visual indicators displayed on the display 904. For example, under the control of the applications 108, the navigation features located on the navigation controller 910 may be mapped to virtual navigation features displayed on the user interface 922. In some embodiments, the navigation controller 910 may not be a separate component but, rather, may be integrated into the platform 902 and/or the display 904.

The system 900 may include drivers (not shown) that include technology to enable users to instantly turn on and off the platform 902 with the touch of a button after initial boot-up, when enabled, for example. Program logic may allow the platform 902 to stream content to media adaptors or other content services device(s) 906 or content delivery device(s) 908 when the platform is turned "off." In addition, the chipset 912 may include hardware and/or software support for 5.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 900 may be integrated. For example, the platform 902 and the content services device(s) 906 may be integrated; the platform 902 and the content delivery device(s) 908 may be integrated; or the platform 702, the content services device(s) 906, and the content delivery device(s) 908 may be integrated. In some embodiments, the platform 902 and the display 904 are an integrated unit. The display 904 and the content service device(s) 906 may be integrated, or the display 904 and the content delivery device(s) 908 may be integrated, for example.

The system 900 may be implemented as a wireless system or a wired system. When implemented as a wireless system, the system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 902 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 9.

Figure 10:
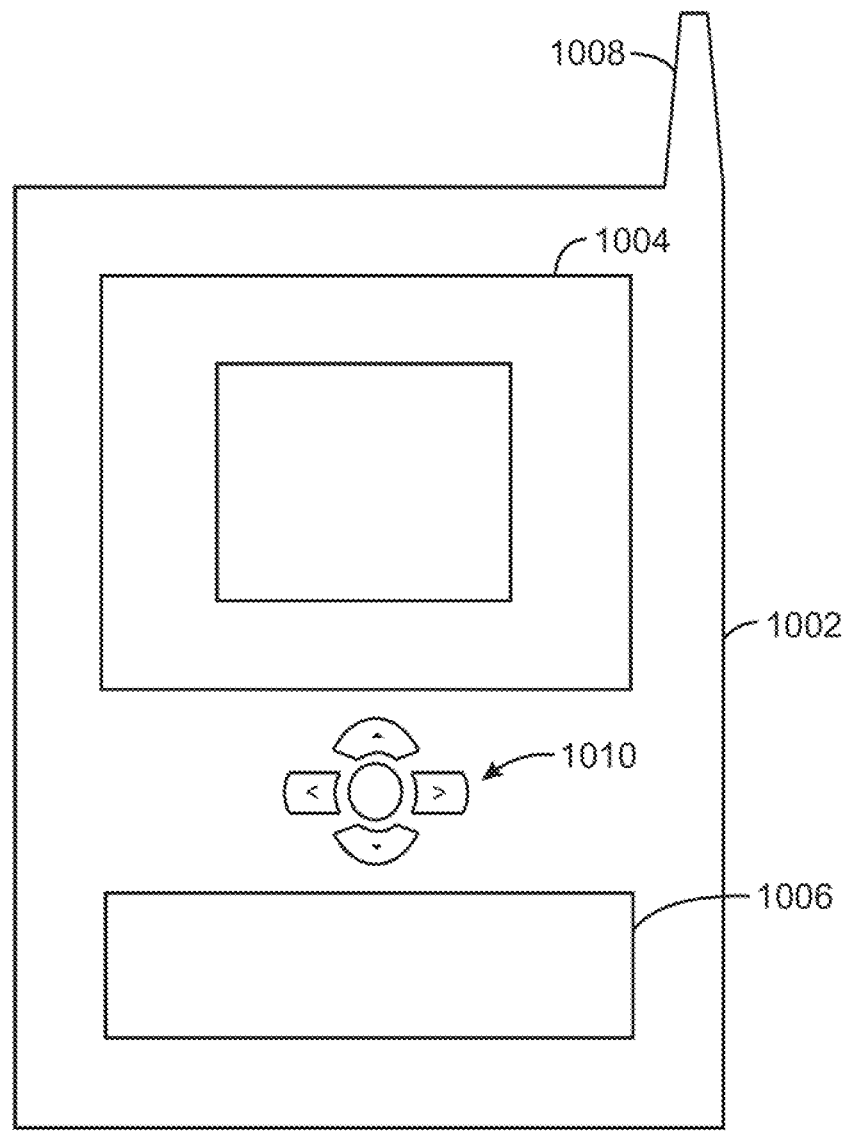
FIG. 10 is a schematic of a small form factor device in which the system of FIG. 9 may be embodied.

FIG. 10 is a schematic of a small form factor device 1000 in which the system 900 of FIG. 9 may be embodied. Like numbered items are as described with respect to FIG. 9. In some embodiments, for example, the device 1000 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well.

As shown in FIG. 10, the device 1000 may include a housing 1002, a display 1004, an input/output (I/O) device 1006, and an antenna 1008. The device 1000 may also include navigation features 1010. The display 1004 may include any suitable display unit for displaying information appropriate for a mobile computing device. The I/O device 1006 may include any suitable I/O device for entering information into a mobile computing device. For example, the I/O device 1006 may include an alphanumeric keyboard, a numeric keypad, a touch pad, input keys, buttons, switches, rocker switches, microphones, speakers, a voice recognition device and software, or the like. Information may also be entered into the device 1000 by way of microphone. Such information may be digitized by a voice recognition device.

Example 1

A computing device is described herein. The computing device includes a central processing unit (CPU) that is configured to execute an application and a graphics scheduler that is configured to operate independently of the CPU. The graphics scheduler is configured to receive work queues relating to workloads from the application that are to execute on the CPU and perform scheduling operations for any of a number of graphics engines based on the work queues.

The graphics scheduler may include a graphics microcontroller and a shim layer. The graphics microcontroller may interface with the graphics engines via the shim layer. The graphics scheduler may be configured to perform scheduling operations for a graphics engine by writing to a runlist port register of the graphics engine. In addition, each of the graphics engines may be configured to execute specific types of workloads.

The graphics scheduler may be configured to access physical memory spaces relating to any of the work queues. To access the physical memory spaces relating to any of the work queues, the graphics scheduler may be configured to translate graphics virtual memory addresses into corresponding physical memory addresses via an input/output memory management unit (IOMMU). The graphics scheduler may also be configured to perform scheduling operations for a display engine based on the work queues. In addition, the graphics scheduler may be configured to collect interrupts from any of the graphics engines, the CPU, or the display engine, or any combinations thereof, via an interrupt aggregator, and use the interrupts to perform the scheduling operations.

The computing device may include a radio, wherein the radio is communicatively coupled to the CPU. The computing device may also include a display, wherein the display is communicatively coupled to the CPU. In addition, the graphics scheduler may be configured to operate independently of a power state of the CPU.

Example 2

A method for performing scheduling operations for graphics hardware is described herein. The method includes receiving, at a graphics scheduler of a computing device, work queues relating to workloads from an application executing on a central processing unit (CPU) of the computing device. The method also includes performing scheduling operations for any of a number of graphics engines based on the work queues, wherein the scheduling operations are performed via the graphics scheduler independently of the CPU.

Performing scheduling operations for a graphics engine may include determining an order of executing workloads for the graphics engine. Determining the order of executing workloads for the graphics engine may include writing to a runlist port register of the graphics engine.

In some embodiments, physical memory spaces relating to any of the work queues may be accessed by translating graphics virtual memory addresses into corresponding physical memory addresses. In addition, in some embodiments, scheduling operations may be performed for a display engine.

Interrupts relating to the scheduling operations may be received from the CPU, the display engine, or any of the graphics engines, or any combinations thereof. The interrupts may be used to perform the scheduling operations. In addition, in some embodiments, an application may be notified upon successful completion of a workload by a corresponding graphics engine.

Example 3

At least one non-transitory machine readable medium having instructions stored therein is described herein. In response to being executed on a computing device, the instructions cause the computing device to receive, at a graphics scheduler, work queues relating to workloads from an application executing on a central processing unit (CPU). The instructions also cause the computing device to perform scheduling operations for any of a number of graphics engines based on the work queues, wherein the scheduling operations are performed via the graphics scheduler independently of the CPU.

Performing the scheduling operations may include determining a graphics engine to execute each of a number of workloads. In addition, performing the scheduling operations for a graphics engine may include determining an order of executing workloads for the graphics engine. Further, in some embodiments, the instructions may cause the computing device to notify the application upon successful completion of a workload by a corresponding graphics engine.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A computing device, comprising:
   a central processing unit (CPU) configured to execute an application;
   graphics hardware comprising graphics engines configured to process graphics tasks received from the application executing on the CPU;
   a graphics scheduler to select one of the graphics engines to execute each of a plurality of workloads, the graphics scheduler comprising a graphics microcontroller and a shim layer and configured to operate independently of the CPU and the graphics hardware, the graphics scheduler to:
   receive interrupts from the graphics hardware and the CPU;
   receive work queues comprising the graphics tasks from the application; and
   schedule the processing of the graphics tasks by the selected graphics engine in response to the interrupts by writing to a runlist port register of the graphics hardware;
   the shim layer to intercept interrupts from the graphics hardware and the CPU and forward the interrupts to the graphics microcontroller.

2. The computing device of claim 1, wherein the graphics hardware comprises graphics engines configured to execute specific types of workloads.

3. The computing device of claim 1, wherein the graphics scheduler is configured to access physical memory spaces relating to any of the work queues.

4. The computing device of claim 3, wherein, to access the physical memory spaces relating to any of the work queues, the graphics scheduler is configured to translate graphics virtual memory addresses into corresponding physical memory addresses via an input/output memory management unit (IOMMU).

5. The computing device of claim 1, wherein the graphics scheduler is configured to perform scheduling operations for a display engine based on the work queues.

6. The computing device of claim 1, comprising a radio, wherein the radio is communicatively coupled to the CPU.

7. The computing device of claim 1, comprising a display, wherein the display is communicatively coupled to the CPU.

8. The computing device of claim 1, wherein the graphics scheduler is configured to operate independently of a power state of the CPU.

9. A method for performing scheduling operations for graphics hardware comprising graphics engines, the method comprising:
   receiving, at a graphics scheduler of a computing device, work queues comprising graphics tasks from an application executing on a central processing unit (CPU) of the computing device;
   receiving, at a shim layer of the graphics scheduler, interrupts from the graphics hardware configured to process the graphics tasks received from the application;
   forwarding the interrupts from the shim layer to a graphics microcontroller of the graphics scheduler;
   scheduling the processing of the graphics tasks by a selected one of the graphics engines in response to the interrupts by writing to a runlist port register of the graphics hardware, wherein the scheduling is performed via the graphics microcontroller independently of the CPU.

10. The method of claim 9, wherein scheduling the processing of the graphics tasks comprises determining an order of executing workloads for the graphics hardware.

11. The method of claim 9, comprising accessing physical memory spaces relating to any of the work queues by translating graphics virtual memory addresses into corresponding physical memory addresses.

12. The method of claim 9, comprising notifying the application upon successful completion of a workload by the graphics hardware.

13. At least one non-transitory machine readable medium having instructions stored therein that, in response to being executed on a computing device, cause the computing device to:
receive, at a graphics scheduler, work queues comprising graphics tasks from an application executing on a central processing unit (CPU);
receive, at a shim layer of the graphics scheduler, interrupts from a graphics hardware configured to process the graphics tasks received from the application, the graphics hardware comprising graphics engines;
forward the interrupts from the shim layer to a graphics microcontroller of the graphics scheduler; and
schedule the processing of the graphics tasks by the graphics hardware in response to the interrupts by selecting graphics engines to execute each of the graphics tasks and writing to a runlist port register of the selected graphics engines, wherein the scheduling is performed via the graphics scheduler independently of the CPU.

14. The at least one non-transitory machine readable medium of claim 13, wherein scheduling the processing of the graphics tasks by the graphics hardware comprises determining an order of executing workloads for each of the graphics engines.

15. The at least one non-transitory machine readable medium of claim 13, wherein the instructions cause the computing device to notify the application upon successful completion of a workload by a corresponding graphics engine.

* * * * *